(12) United States Patent
Bennett

(10) Patent No.: US 9,215,954 B2
(45) Date of Patent: Dec. 22, 2015

(54) TWIST-ACTION MIXING BOTTLE

(71) Applicant: Colin Mortimer Bennett, New York, NY (US)

(72) Inventor: Colin Mortimer Bennett, New York, NY (US)

( * ) Notice: Subject to any disclaimer, the term of this patent is extended or adjusted under 35 U.S.C. 154(b) by 350 days.

(21) Appl. No.: 13/955,142

(22) Filed: Jul. 31, 2013

(65) Prior Publication Data
US 2015/0036455 A1   Feb. 5, 2015

(51) Int. Cl.
*B65D 25/08*   (2006.01)
*A47J 43/27*   (2006.01)
*B65D 51/28*   (2006.01)
*B65D 81/32*   (2006.01)

(52) U.S. Cl.
CPC ............... *A47J 43/27* (2013.01); *B65D 25/08* (2013.01); *B65D 51/2864* (2013.01); *B65D 81/3211* (2013.01)

(58) Field of Classification Search
CPC ............ B65D 25/08; B65D 51/2835; B65D 51/2864; B65D 81/3211; B65D 81/3266; A47J 43/27; A47J 43/1068
USPC .............. 206/219–222, 568; 215/6, 227, 228, 215/DIG. 8; 99/356, 357; 366/130, 184, 192
See application file for complete search history.

(56) References Cited

U.S. PATENT DOCUMENTS

| | | | | |
|---|---|---|---|---|
| 6,039,197 A | * | 3/2000 | Braun ................ | B65D 47/0861 215/228 |
| 8,875,926 B2 | * | 11/2014 | Grajqevci ............ | B65D 47/265 206/219 |
| 2004/0149599 A1 | * | 8/2004 | Cho .................... | B65D 51/2892 206/219 |
| 2008/0142030 A1 | * | 6/2008 | Venere ............... | A45D 19/0008 206/219 |
| 2010/0284243 A1 | * | 11/2010 | Umsonst-Kubler .. | A47J 43/105 366/192 |
| 2014/0313850 A1 | * | 10/2014 | Kang .................. | B01F 15/0215 366/192 |

* cited by examiner

*Primary Examiner* — Luan K Bui
(74) *Attorney, Agent, or Firm* — James M. Smedley LLC; James Michael Smedley, Esq.

(57) ABSTRACT

A twist action mixing container is capable of separately storing various substances for later mixing. The mixing container includes an upper and lower housing which respectively define an upper and lower chamber. The upper and lower chambers are separated by a valve assembly that seals off one chamber from the other until the valve assembly is opened. The valve assembly includes upper and lower valve halves, each of which includes one or more tracks along their periphery and corresponding guide members that insert into said tracks. When the upper and lower housings are twisted in opposite directions, the guide members travel along their respective tracks moving upper and lower valve openings into alignment, thus opening the valve assembly. A preventer is operably coupled to the lower valve for blocking the container opening while the valve assembly is closed.

18 Claims, 16 Drawing Sheets

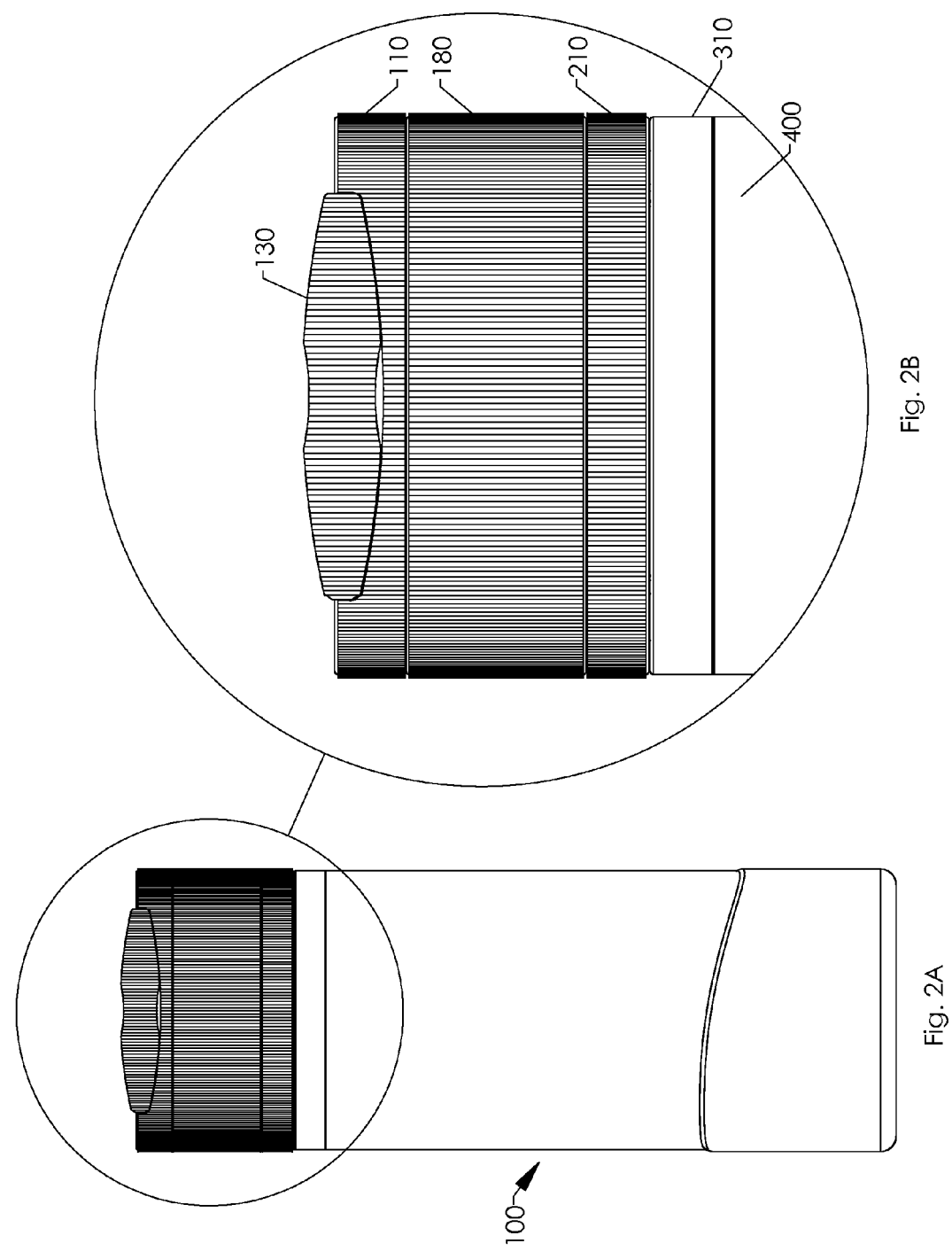

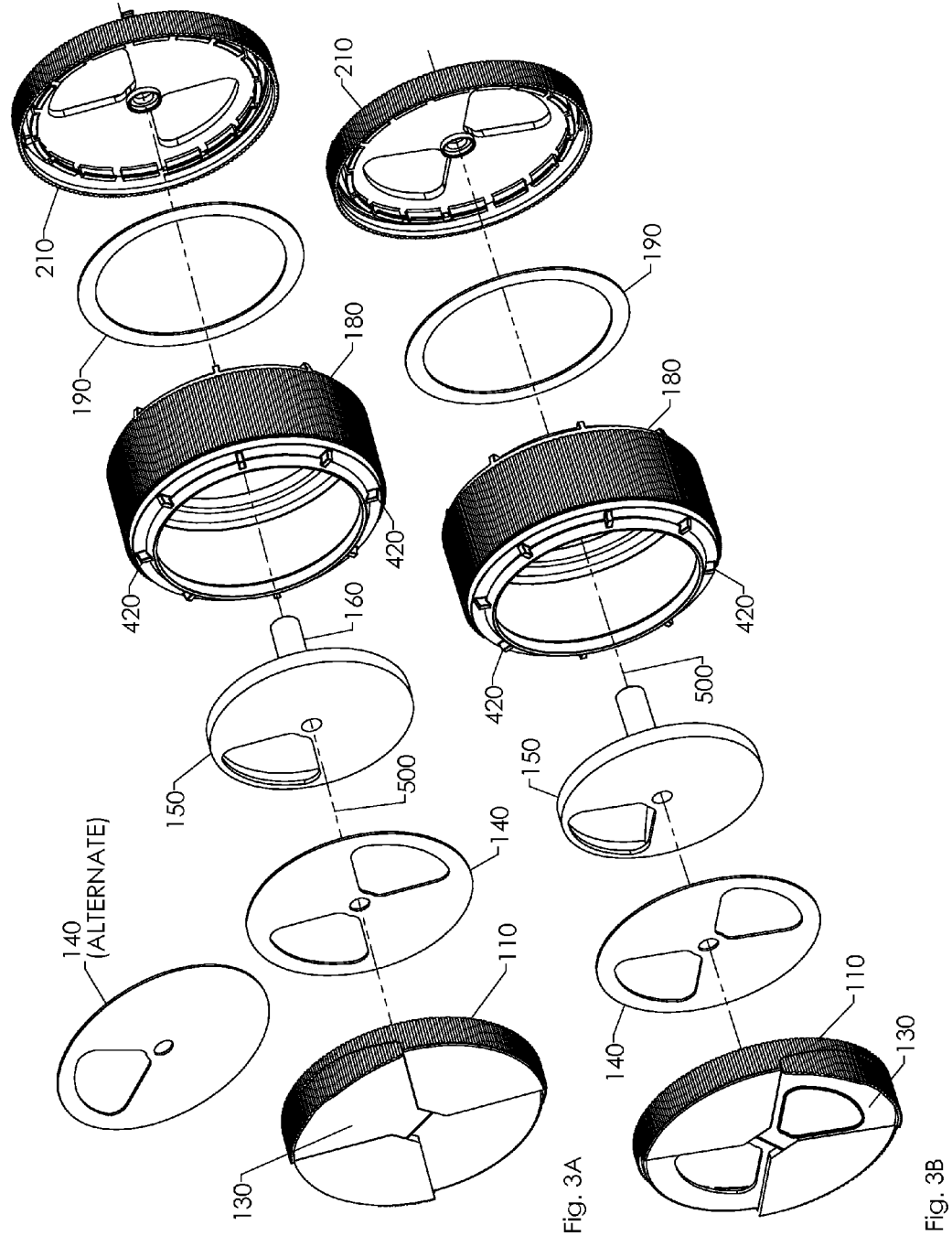

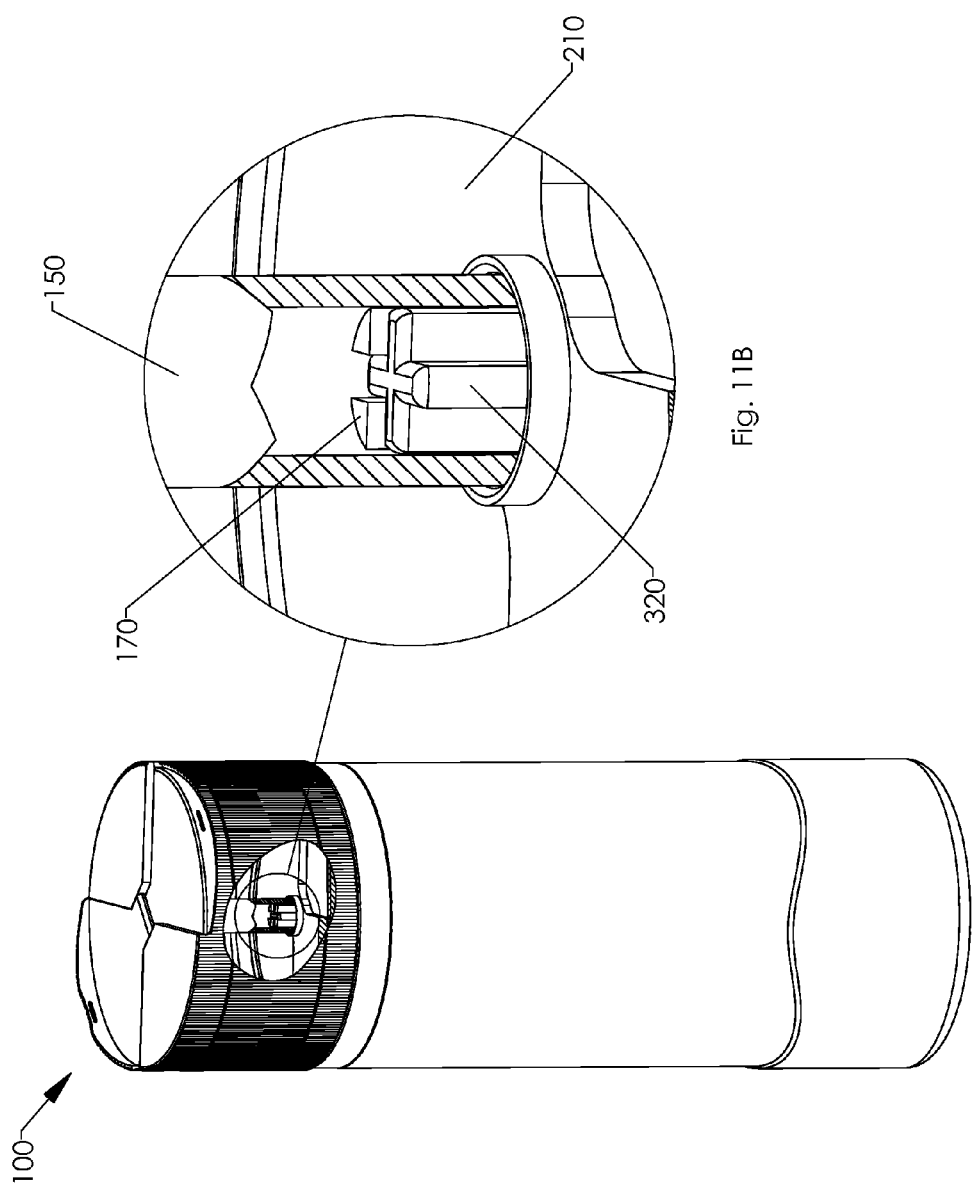

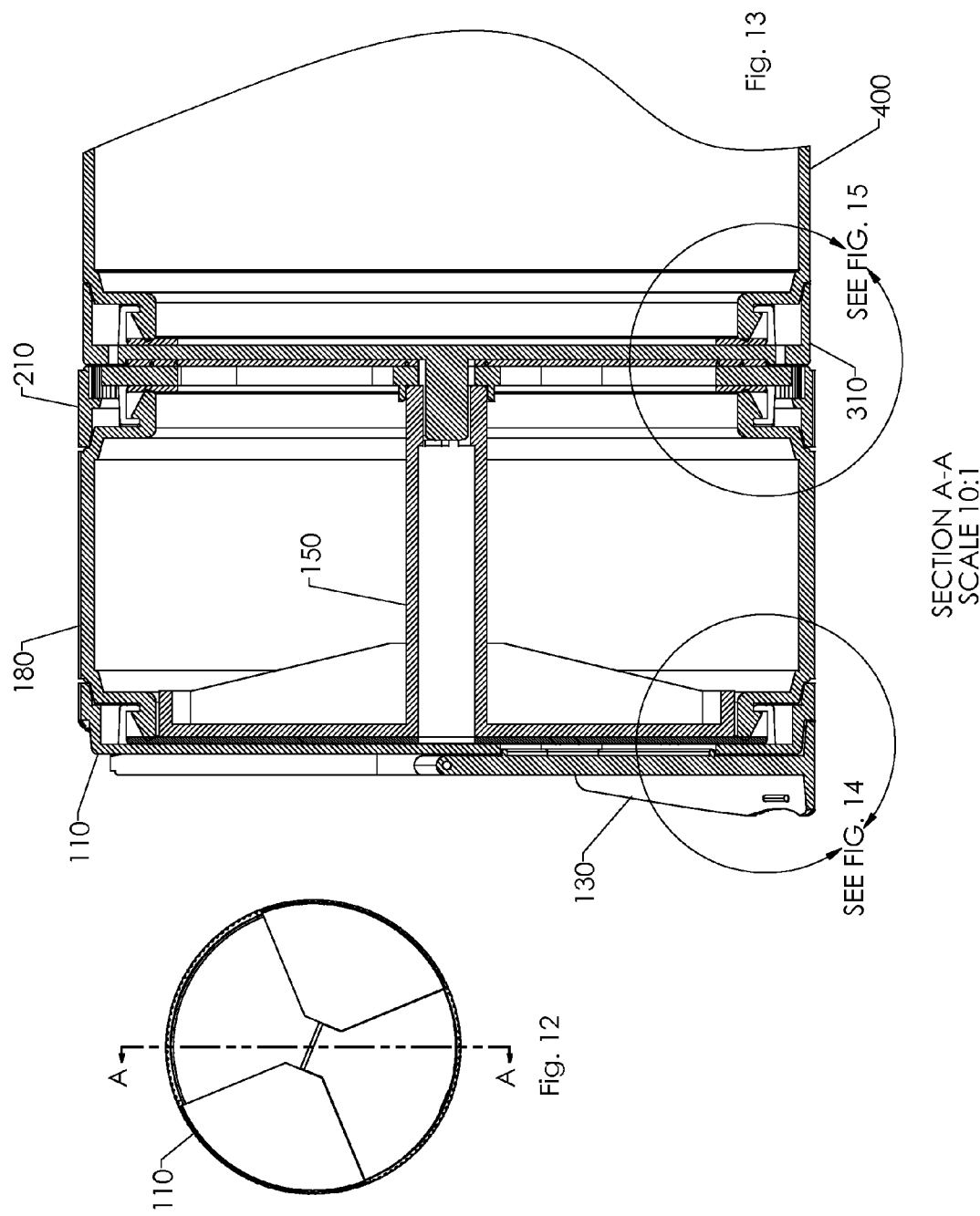

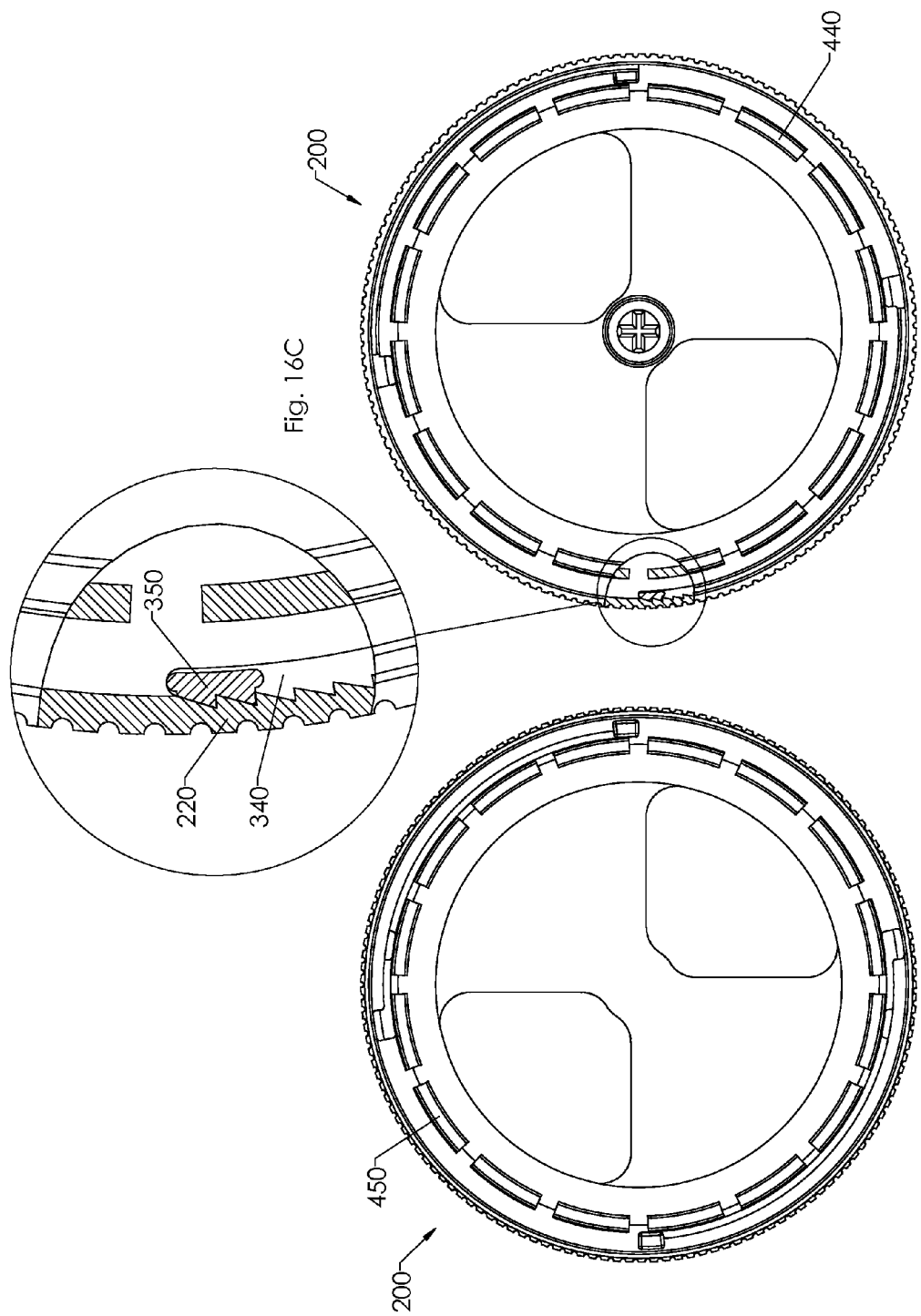

TWIST-ACTION MIXING BOTTLE

FIELD OF THE INVENTION

The present invention generally relates to beverage containers. Specifically, the invention relates to a mixing container configured to store contents in separate chambers within the same vessel while providing the ability to mix said contents by manually rotating the housings that enclose the chambers of the apparatus. The twist-action rotation of the housings opens a valve assembly, allowing the contents of the chambers to mix to a preferred concentration. Additionally, exemplary embodiments of the mixing apparatus may include pressurized chambers. Further, certain embodiments may utilize various types of action elements in order to engage the rotation of the housing.

CROSS-REFERENCE TO RELATED APPLICATIONS

This application claims the benefit of provisional patent application: U.S. Pat. App. No. 61/729,039 filed on Nov. 21, 2012, which is hereby incorporated by reference in its entirety.

BACKGROUND

Bottles or containers are used in a variety of industries where a premixed solution is produced and sold. An example of such an industry is the consumer beverage industry. It is not uncommon for a spirits or soft drink company to produce a premixed beverage, containing alcohol in some cases, which is then bottled or canned and sold through retail channels.

Most commonly, these beverages are sold premixed to consumers. Some of the drawbacks with this is that the shelf life of the solution is shortened when organic ingredients are used, the efficacy/strength of the solution diminishes at a faster rate, and the user is denied the satisfaction of mixing the contents themselves to a concentration of their own preference.

Further, continuing with the consumer beverage example, with the rise in popularity of mixology, consumers are keen to experience the activity of cocktail making, even a simplified version. It would be advantageous to incorporate elements of the cocktail making experience into the package design of an consumer beverage. Consumer beverage packaging currently in use lacks any interactive mixing experience for the user.

Additionally, users have traditionally had to purchase alcohol and mixers separately. There is added convenience in a package design that combines both as well as some fun for the user in the process of mixing a concoction to their liking. This is currently impossible with package designs in present use.

Therefore, there is a need in the art for a package designed with an internal mixing apparatus which allows the user the satisfaction of manually mixing the contents to their liking. These and other features and advantages of the present invention will be explained and will become obvious to one skilled in the art through the summary of the invention that follows.

SUMMARY OF THE INVENTION

In accordance with the purposes of the present invention, as embodied and broadly described herein, the present invention is a twist-action mixing container having an upper and lower housing. The upper and lower housing respectively define upper and lower chambers. A split valve assembly separates the two chambers and seals them off from each other, so that the contents of one chamber do not come in contact with the contents of the other chamber until the valve assembly is opened.

According to an embodiment of the present invention, a twist-action mixing container includes: an upper housing, the upper housing defining an upper chamber; a lower housing, the lower housing defining a lower chamber; a valve assembly interposed between the upper housing and lower housing; a rotatable preventer seated at the top of the upper housing; and a lid component with an opening, the lid component being secured to the top of the upper housing, wherein the valve assembly forms a seal between the upper and lower chambers and comprises an upper valve half and a lower valve half, wherein the upper valve is secured to the bottom of the upper housing and the lower valve half is secured to the top of the lower housing, wherein the lower valve half comprises an interlock member, wherein the upper and lower valve halves each comprise at least one track and corresponding guide member, wherein the upper valve track is configured to securely receive the lower valve guide member and the lower valve track is configured to securely receive the upper valve guide member thereby joining the upper and lower valve halves together to form the valve assembly, and wherein the guide members in the valve assembly travel along their corresponding tracks when at least one of the housings is rotated relative to the other, wherein the rotatable preventer comprises an opening and a shaft configured to receive the interlock member so as to operably couple the preventer to the lower valve half, such that the preventer and the lower valve half are able to rotate in concert, wherein the preventer is configured to prevent the contents of the container from passing through the lid opening until the preventer opening is aligned with the openings of the upper and lower valve halves and the lid opening is uncovered; whereby the housings may be rotated in opposite directions, thereby causing the guide members to travel along their corresponding tracks until the openings of the lower valve, upper valve, preventer, and lid are aligned, allowing the contents of either chamber to flow into the other chamber where they can mix and be poured out of the container.

According to an embodiment of the present invention, the lid component is secured to the upper housing with one or more retaining members along its inner periphery that mate with one or more hook members along the top outer rim of the upper housing.

According to an embodiment of the present invention, the upper valve half is secured to the upper housing with one or more retaining members along its top periphery that mate with one or more hook members along the bottom outer rim of the upper housing.

According to an embodiment of the present invention, the lower valve half is secured to the lower housing with one or more retaining members along its bottom periphery that mate with one or more hook members along the top outer rim of the lower housing.

According to an embodiment of the present invention, a gasket is interposed between the preventer and the lid component.

According to an embodiment of the present invention, a gasket is interposed between the upper housing and the upper valve half.

According to an embodiment of the present invention, the upper valve half comprises one or more gasket interface ribs configured to receive one or more of the gasket and the upper housing.

According to an embodiment of the present invention, a gasket is interposed between the lower valve half and the lower housing.

According to an embodiment of the present invention, the lower valve half comprises one or more gasket interface ribs configured to receive one or more of the gasket and the lower housing.

According to an embodiment of the present invention, the gaskets form hermetic seals around the chambers.

According to an embodiment of the present invention, the interlock member extends from the center, top side of the lower valve half.

According to an embodiment of the present invention, at least one upper valve track comprises ratcheting teeth that engage with a corresponding lower valve guide member, so as to allow one-way travel of the guide member along the track.

According to an embodiment of the present invention, at least one lower valve guide member comprises ratcheting teeth that cooperate with the corresponding upper valve track ratcheting teeth to allow one-way travel of the guide member along the track.

According to an embodiment of the present invention, at least one of the tracks comprise: a loading port at the beginning of the track for initially receiving and anchoring a corresponding guide member; and a release port at the end of the track for optionally releasing the guide member after it has traveled the length of the track; whereby release of the guide members allows the upper and lower valve halves and upper and lower housings to separate.

According to an embodiment of the present invention, the lid comprises a removable cap.

According to an embodiment of the present invention, the lid comprises a flip top cap.

According to an embodiment of the present invention, the interlock member is a cruciform.

According to another embodiment of the present invention, a twist-action mixing container includes: two or more vertically stacked compartments, each compartment defining a chamber; a valve assembly interposed between each of the compartments; a rotatable preventer seated at the top of the uppermost compartment; and a lid component with an opening, the lid component being secured to the top of the uppermost compartment; wherein the valve assembly forms a seal between each of the chambers and comprises an upper valve half and a lower valve half, wherein the upper valve is secured to the bottom of every compartment except the lowest compartment and the lower valve half is secured to the top of every compartment except the top compartment, wherein each of the lower valve halves comprises an interlock member operably coupled to the lower valve half of the split valve assembly directly above it, wherein the upper and lower valve halves each comprise at least one track and corresponding guide member, wherein the upper valve track is configured to securely receive the lower valve guide member and the lower valve track is configured to securely receive the upper valve guide member thereby joining the upper and lower valve halves together to form the valve assembly, and wherein the guide members of the valve assembly travel along their corresponding tracks when at least one compartment attached to the valve assembly is rotated, wherein the rotatable preventer comprises an opening and a shaft configured to receive the interlock member of the lower valve half in the valve assembly directly below it, so as to operably couple the preventer to all of the lower valve halves, such that the preventer and the lower valve halves are able to rotate in concert, wherein the preventer is configured to prevent the contents of the container from passing through the lid opening until the preventer opening is aligned with the openings of the upper and lower valve halves and the lid opening is uncovered; whereby the at least one compartment may be rotated relative to the others, thereby causing the guide members in the valve assembly attached to the compartment to travel along their corresponding tracks until the openings of the valve assemblies, preventer, and lid are aligned, allowing the contents of the compartments to flow between the chambers, mix and be poured out of the container.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

BRIEF DESCRIPTION OF THE DRAWINGS

FIG. 2A is a front elevational view an exemplary embodiment of the twist-action mixing container;

FIG. 2B is a close-up view of the top portion of the twist action mixing container of FIG. 2A;

FIG. 3A is an exploded view of the upper housing assembly an exemplary embodiment of the twist-action mixing container in a closed position;

FIG. 3B is an exploded view of the upper housing assembly an exemplary embodiment of the twist-action mixing container in an open position;

FIG. 11A is a partial sectional view of the top portion of an exemplary embodiment of the twist-action mixing container;

FIG. 11B is a close-up view of the broken-out section of FIG. 11A;

FIG. 12 is a top plan view of an exemplary embodiment of the twist-action mixing container;

FIG. 13 is a partial sectional view along the line A-A of FIG. 12;

FIG. 16A is a bottom plan view of the split valve assembly of FIG. 5A;

FIG. 16B is a top plan view of the split valve assembly of FIG. 5A;

FIG. 16C is an close-up partial sectional view of the split valve assembly of FIG. 16B showing a lower valve guide member inside an upper valve track;

DETAILED SPECIFICATION

Figure 1A:
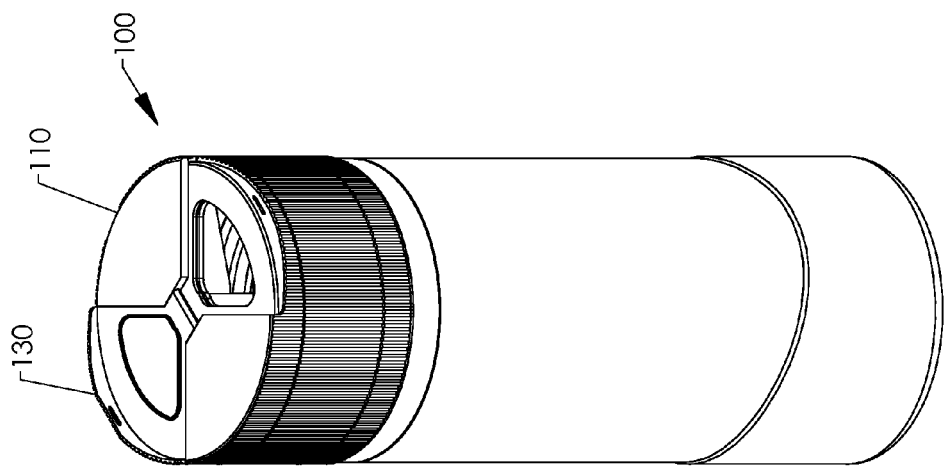
FIG. 1A is a perspective view of the twist-action mixing container showing a flip-top cap of the invention in a closed position.

In accordance with the purposes of the present invention, as embodied and broadly described herein, the present invention is a twist-action mixing container having an upper and lower housing. The upper and lower housing respectively define upper and lower chambers. A split valve assembly separates the two chambers and seals them off from each other, so that the contents of one chamber do not come in contact with the contents of the other chamber until the valve assembly is opened.

According to an embodiment of the present invention, a split valve assembly includes an upper valve half and a lower valve half. The upper valve half is attached to the bottom of the upper housing, while the lower valve half is attached to the top of the lower housing. The upper and lower valve halves each include two opposite side tracks along their respective peripheries and two opposite side guide members. The upper valve tracks are configured to receive the lower valve guide members and the lower valve tracks are configured to receive the upper valve guide members. The guide members are inserted and retained in their respective tracks through a loading port at the beginning of each track, and once inserted therein are able to travel along their respective tracks. Once the guide members are inserted in their respective tracks, the upper valve and lower valve are connected, forming the split valve assembly of the present invention.

According to an embodiment of the present invention, a guide members travel along their respective tracks when the upper and lower valve halves are rotated in opposite directions thereby allowing openings in the upper and lower valve halves to come into alignment. Since the upper and lower valve halves are attached to the upper and lower housings, rotation of the upper and lower valves can be accomplished by twisting the upper and lower housings. When the guide members reach the ends of their respective tracks, the upper and lower valve half openings are fully aligned, allowing the contents of the upper chamber to flow into the lower chamber through the open valve assembly.

According to an embodiment of the present invention, a twist-action mixing container also includes a rotatable preventer seated at the top of the upper housing. The preventer blocks the contents of the container from reaching the container opening until the valve assembly is opened and the contents are mixed. More specifically, the preventer includes at least one opening and a shaft configured to receive an interlock member that extends from the lower valve half. When the interlock member is inserted into the preventer shaft, the preventer and lower valve half are operably coupled so that they can rotate in concert. Thus, when the lower valve and upper valve are rotated the preventer also rotates, causing the openings of the preventer, the upper and lower valves and, where applicable, lid mouth to come into alignment.

According to an embodiment of the present invention, a twist-action mixing container also includes a lid securely attached to the upper housing. The lid includes an opening that is sealed by a removable cap. The opening of the lid aligns with the preventer opening when the split valve assembly is in an open position. Thus, the lid opening, preventer opening and valve assembly opening are not aligned until valve assembly is opened. Once the valve assembly is opened and the contents of the upper and lower chamber are mixed, the user can shake the container to more thoroughly mix the contents while keeping the cap in place over the lid opening to prevent the contents from escaping.

According to an embodiment of the present invention, a twist-action mixing container of the present invention allows the contents of the separate chambers to be mixed by twisting the upper and lower housings until the upper and lower valve halves are aligned. The contents can then be shaken and the mixture poured out of the lid opening. The twist-action mixing container is especially useful for mixing drinks on the spot, but may also be used for other types of substances that can be mixed for industrial purposes.

Referring to the Figures in general, the twist-action mixing container of the present invention 100 includes an upper housing 180 and a lower housing 400. The upper housing encloses an upper chamber, while the lower housing encloses a lower chamber. The upper and lower chambers are separated by a split valve assembly 200 having an upper valve half 210 and a lower valve half 310. The split valve assembly forms a seal between the upper and lower chambers so that the contents of the upper chamber cannot mix with the contents of the lower chamber while the valve assembly is in a closed position. The terms "split valve assembly" and "valve assembly" shall be regarded as equivalent terms throughout this application.

Figure 15:
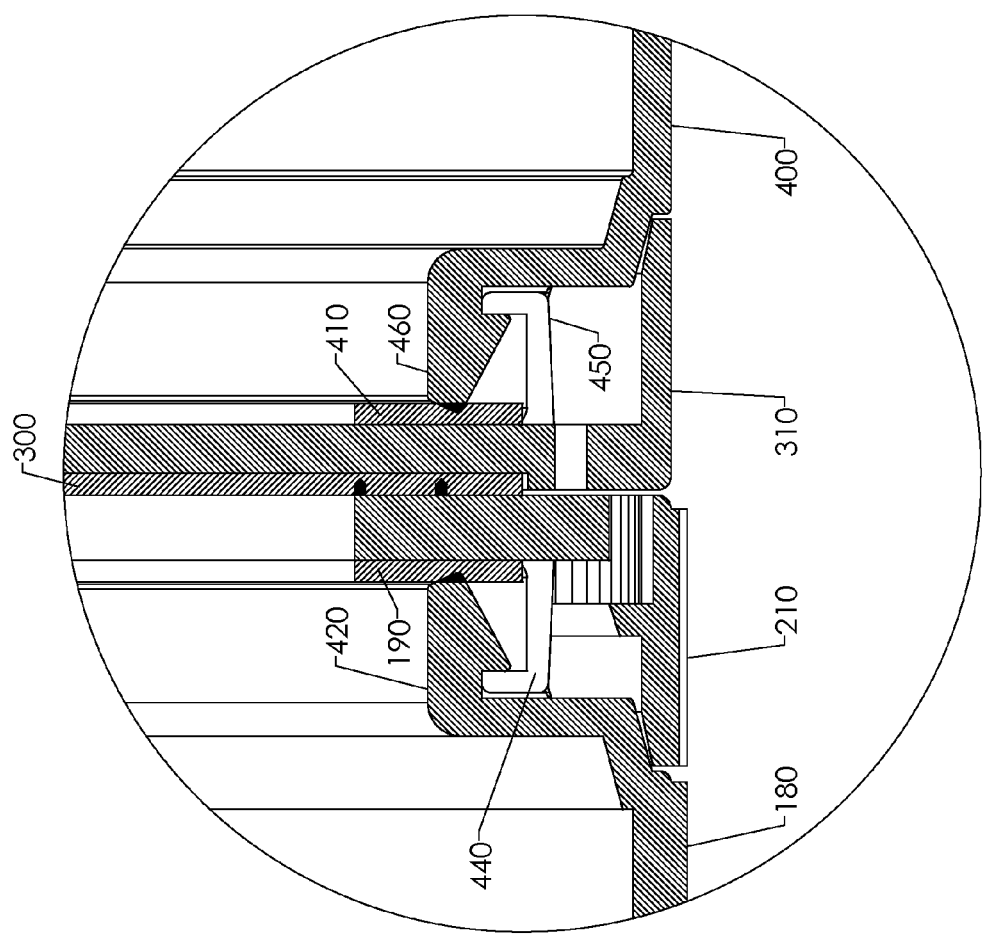
FIG. 15 is a partial sectional view of the upper housing, lower housing, and split valve assembly of an exemplary embodiment of the twist-action mixing container.

As shown in FIG. 15, the upper valve half is attached to the bottom of the upper housing, while the lower valve half is attached to the top of the lower housing. In a preferred embodiment, the upper valve half 210 includes a ring of retaining flange members 440 along its top, inner periphery. The retaining flange members 440 attach to retaining clips 420 disposed along the lower rim of the upper housing 180. Similarly, the lower valve half includes a ring of retaining flange members 450 along its bottom, inner periphery, which attach to retaining clips 460 disposed along the upper rim of the lower housing. In another embodiment, one continuous flange member may be used instead of the plurality of spaced apart flange members 440 shown, for example, in FIG. 5A. In a further embodiment, the upper and lower valve halves connect to the upper and lower housings respectively by inserting one or more flange members into one or more corresponding slots. One of ordinary skill in the art will recognize that other means of connecting the upper and lower valve halves to the upper and lower housings are possible, including threading them together, or fastening them together with screws. The terms "upper and lower valve halves" and "upper and lower valves" shall be regarded as equivalent terms throughout this application.

Figure 7:
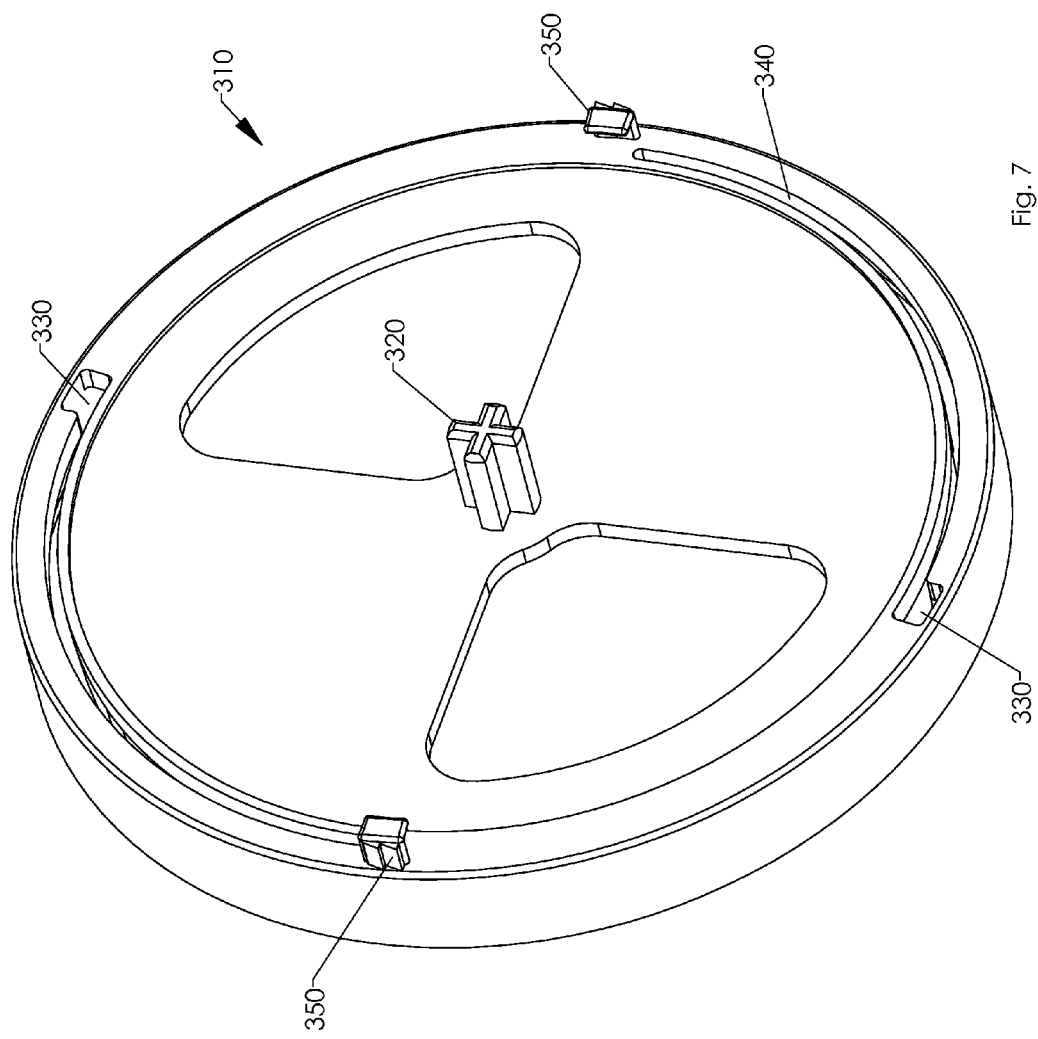
FIG. 7 is a perspective view of the lower valve half of the split valve assembly of FIG. 5A.

According to an embodiment of the present invention, a lower valve half 310 of the split valve assembly includes an interlock member 320 extending from its top center. In a preferred embodiment, the interlock member is a cruciform as shown in FIG. 7, but a person of ordinary skill in the art would appreciate that the interlock member may have a different cross sectional shape such as a triangle, square, star, or other polygon. The interlock member is configured to operably connect to a rotatable preventer 150, as shown in FIGS. 11A-11B.

Figure 5:
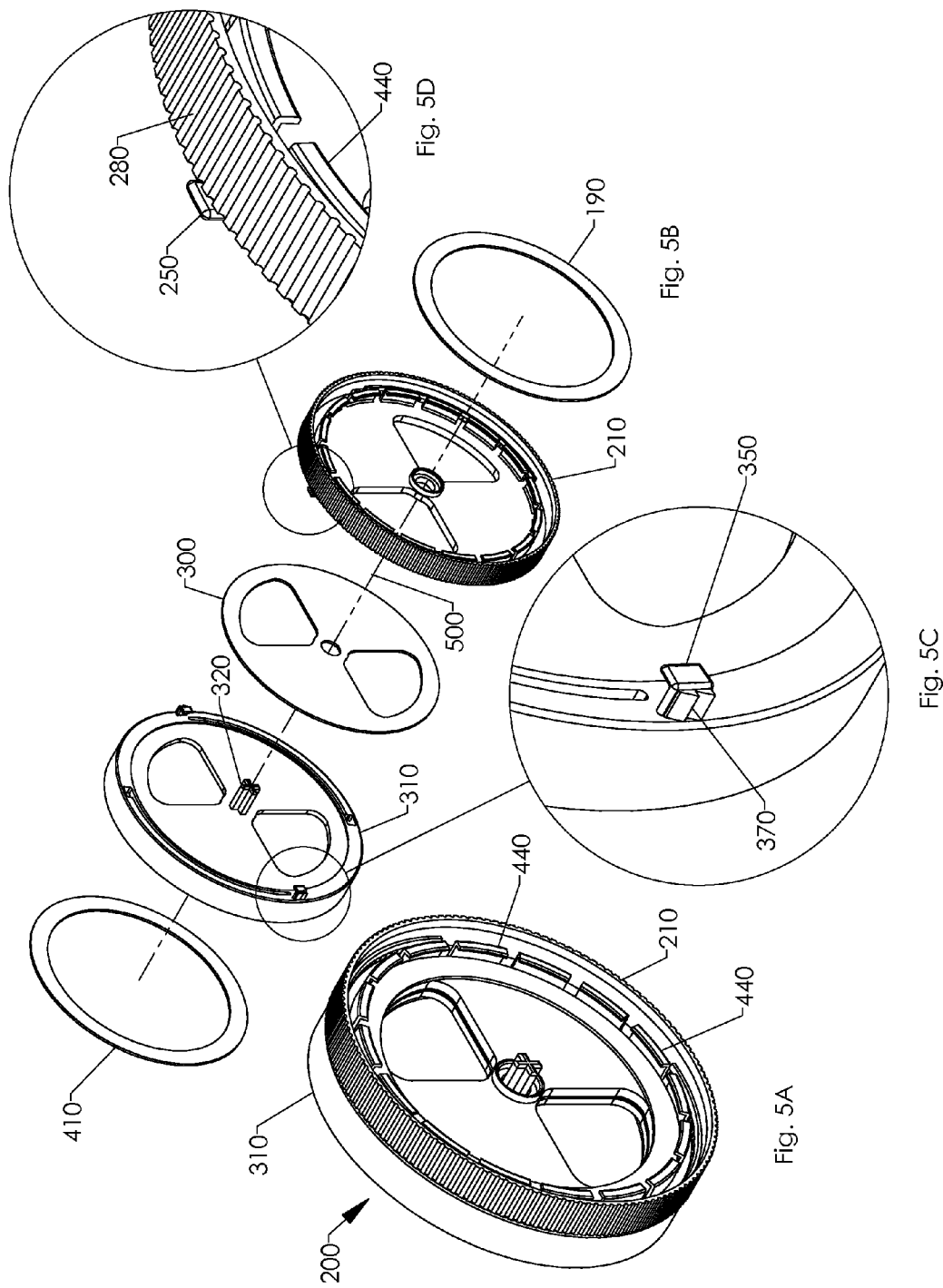
FIG. 5A is a perspective view of the split valve assembly an exemplary embodiment of the twist-action mixing container.
FIG. 5B is an exploded view of the split valve assembly an exemplary embodiment of the twist-action mixing container.
FIG. 5C is a close-up view of a guide member of the lower valve half.
FIG. 5D is a close-up view of the ribbed outer surface of the upper valve half.

According to an embodiment of the present invention, an upper and lower valve half are connected to each other to form the valve assembly of FIG. 5A. In a preferred embodiment, the mating side of the upper and lower valve halves includes two oppositely disposed semi-circular tracks and two oppositely disposed guide members. Each of the tracks 240 in the upper valve half 210 is configured to receive a corresponding lower valve guide member 350. Similarly, each of the tracks 340 in the lower valve half 310 is configured to receive a corresponding upper valve guide member 250. In other words, when the mating sides of the respective upper and lower valve halves face each other, each guide members is inserted into a loading port in a corresponding track in the opposing valve half. Once the guide members are inserted into their respective loading ports they are securely retained therein and are able to travel along the track when the housings are twisted in opposite directions. In an alternate embodiment, the guide members travel along their respective tracks when at least one of the housings is rotated with respect to the other.

According to a preferred embodiment of the invention, both housings must be rotated in opposite directions for the respective upper and lower valve guide members 250 and 350 to travel along their respective tracks. As the guide members travel along their respective tracks, the upper and lower valves rotate in opposite directions. As the upper and lower valve halves rotate, one or more opening in the respective upper and lower valve halves move closer together and eventually start to overlap. When the guide members reach the end of their respective tracks, the openings of the upper and lower valve halves are in complete alignment, or completely overlap. In this position, the split valve assembly 200 is in a completely open position as shown in FIG. 5A, and the contents of the upper and lower chambers are able to flow together through the opening in the split valve assembly.

Alternatively, either one of the housings may be rotated with respect to the other, which causes the respective guide members of the upper and lower valves to travel along their respective tracks. The openings in the upper and lower valves similarly move into alignment as the guide members move along their respective tracks. Once the guide members reach the end of their respective tracks, the openings are fully aligned, allowing the contents of the chambers to pass through the open split valve assembly and mix together.

As noted above, the twist-action mixing container includes a rotatable preventer 150. The preventer is securely seated at the top of the upper housing 180 and prevents the contents of the container from being poured out of the lid opening until the split valve assembly 200 is in an open position. The preventer includes a shaft 160 that extends down from its center and is configured to receive the interlock member 320 extending upward from the center of the lower valve half 310, as shown in FIGS. 11A-11B. When the interlock member is inserted into the shaft the preventer 150 and the lower valve half 310 are operably coupled allowing the preventer and lower valve half to rotate in concert. The preventer also has at least one opening through which the contents of the mixing container may be poured when the valve assembly 200 and lid opening are in an open position.

According to an embodiment of the present invention, a split valve assembly 200 is in an open position when at least one opening of the upper valve half 210 is aligned with at least one opening in the lower valve half 310. If the openings of the upper and lower valve halves are partially aligned, the contents of the chambers are able to mix, but at a slower rate. The openings of the upper and lower valve halves may thus be partially or fully aligned. In either case, the contents of the upper chamber are able to flow into the lower chamber, but the rate of flow will be different.

Since the lower valve half is operably coupled to the preventer, the preventer rotates in concert with the lower valve half. The preventer opening therefore also comes into alignment with the upper valve half opening as the guide members travel along their respective tracks. In other words, the preventer opening is initially closed by virtue of the fact that it is not aligned with the upper valve half opening. However, as the lower valve half rotates, so does the preventer, thus causing the preventer opening to move into alignment with the opening of the upper valve half. Since the preventer and the lower valve half move in concert their openings are always aligned, but the preventer is not open, (i.e. the openings of the upper valve half and preventer are not aligned) until the valve assembly is open (i.e. the upper and lower valve half openings overlap). Once the split valve assembly is open, the preventer opening is aligned with the upper and lower valve half openings and is therefore in an open position.

According to an embodiment of the present invention, a twist-action mixing container of the present invention 100 may further include a removable lid component 110 secured to the top of the upper housing 180. The terms "lid component" and "lid" shall be regarded as equivalent terms throughout this application. In a preferred embodiment, the lid component includes an opening that may be covered by a removable cap 130. The removable cap is preferably a flip-top cap, but could be another type of cap including a screw-on cap, twist-off cap, pull-off cap, or other cap known in the art.

Figure 14:
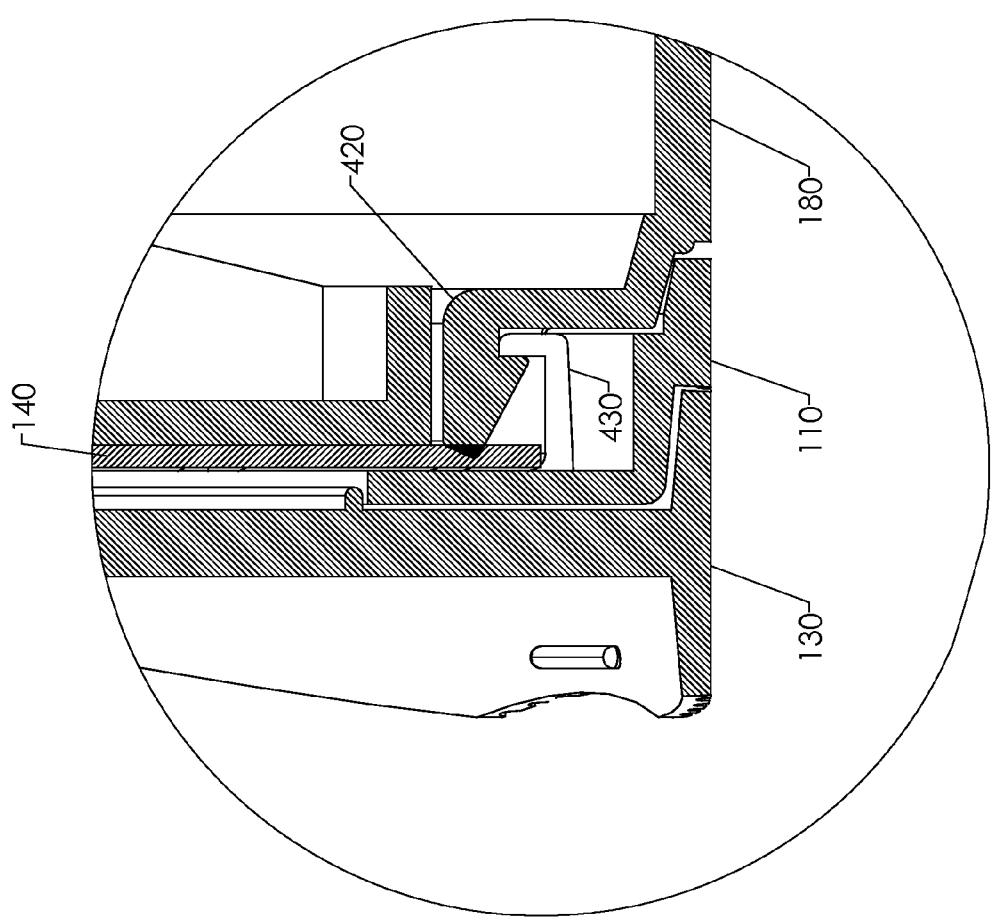
FIG. 14 is a partial sectional view of the top portion an exemplary embodiment of the twist-action mixing container.

According to a preferred embodiment, the lid includes one or more retaining flange members 430 along its inner periphery, such as those associated with the upper and lower valve halves. The one or more retaining flange members of the lid may clip onto one or more corresponding retaining clips 420 disposed along the rim of the upper housing, thus forming a seal between the lid and the upper housing as shown in FIG. 14. In an alternative embodiment, the one or more retaining flange members may be inserted into one or more corresponding slots along the outer rim of the upper housing. One of ordinary skill in the art would also recognize that the lid of the present invention may also be threaded onto the top of the upper housing, or connected thereto by other means known in the art.

As discussed above, as long as the preventer 150 is in a closed position (i.e. the preventer opening is not aligned, either partially or fully, with the split valve assembly opening) the contents of either chamber cannot pass though the lid opening of the mixing container 100. In other words, the preventer blocks the contents from passing through the lid opening. As previously discussed, the preventer 150 is opened when the split valve assembly 200 is opened, allowing the contents of the chambers to mix. Once the preventer is open, a user may optionally open the lid cap and pour out the mixture or keep the lid cap closed and shake the contents to provide a more thorough mixing of the contents. If the user opens the lid cap and the preventer is open, the mixture may be poured out.

Figure 1B:
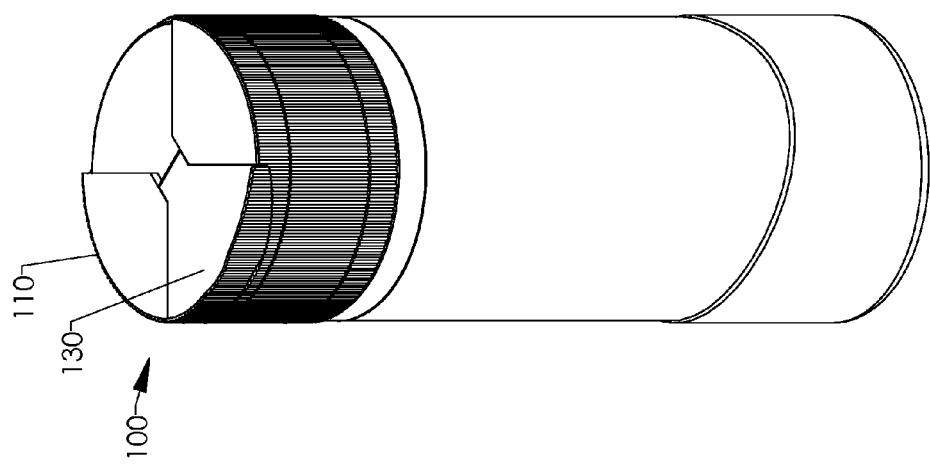
FIG. 1B is a perspective view of the twist-action mixing container showing a flip-top cap of the invention in an open position.

FIGS. 1A-1B show the twist action mixing container in an open and closed position. In the closed position, the flip-top cap 130 seals the lid opening. In the open position, the flip-top cap 130 is pulled back, exposing the lid opening. The preventer 150 disposed underneath the lid 110 is also in an open position, which means the contents of the container have mixed and may be poured out. In addition, the figures show the ribbed outer surface of the upper valve half, upper housing, lid, and the lip of the flip-top cap. The ribbed surface provides a better grip for manually twisting the upper portion of the container. Similarly, the lip of the flip-top cap can be easily gripped to open and close the cap.

One of ordinary skill in the art will appreciate that various gripping means may be utilized to facilitate rotation of the upper portion of the container. One of ordinary skill in the art will further recognize that rotating any segment of the ribbed upper portion of the mixing container (i.e. the upper valve half, upper housing, or lid) will rotate the entire upper portion of the container since the upper valve half, upper housing and lid are all connected. Furthermore, although not shown in the drawings, the lower housing may similarly include a ribbed outer surface.

FIGS. 2A-2B show a close-up view of the ribbed upper portion of the twist-action mixing bottle. FIG. 2B clearly illustrates different sections of the mixing container including the lower housing 400, lower valve half 310, upper valve half 210, upper housing 180, lid component 110, and flip-top cap 130.

FIGS. 3A-3B each show an exploded view of the upper housing assembly in a closed position (FIG. 3A) and an open position (FIG. 3B). The term upper housing assembly includes the upper housing and all of its associated component parts. In a closed position, the openings in the preventer 150 are not aligned with the upper valve half 210, while in the open position the openings are aligned. In the open position, the contents of the mixing container are able to mix and the mixture is able to pass through the preventer. However, the flip-top cap must also be open for the contents to pass through the lid opening.

In a preferred embodiment of the invention, the upper housing assembly also includes a cap gasket 140 between the preventer 150 and the lid 130. The cap gasket 140 includes at least one opening which may be aligned with the preventer opening, so as not to obstruct it. The cap gasket is preferably held in place by upper housing retaining clips 420 which compress the gasket against the upper lid as shown in FIG. 14. The cap gasket thus remains stationary when the underlying preventer rotates.

As the split valve assembly is opened the preventer opening becomes aligned with the cap gasket opening. In other words, the upper and lower valve half openings (i.e. split valve opening), the preventer opening, and cap gasket opening all become aligned with the lid opening, allowing the contents to be poured out of the container. In another embodiment, the cap gasket may be conformed to snap into a retaining frame on the preventer or on the underside of the lid. In a further embodiment, the cap gasket 140 may be affixed to either the preventer, or the underside of the lid using an adhesive. In this embodiment, the cap gasket opening is always aligned with the preventer opening.

A ring gasket 190 is similarly disposed between the upper valve half and the upper housing. The ring gasket sits along the periphery of the upper valve half, between the retaining flange members 440 and the inner rim wall of the upper valve half. In addition, FIGS. 3A-3B show the axis of rotation 500 of the components of the upper housing assembly.

As previously discussed, upper valve half 210 attaches to the upper housing by clipping the retaining flange members 440 to the upper housing retaining clips 420. When the upper valve half is attached to the upper housing, it fits snugly over the upper housing rim so that the outer surface of the upper valve half is flush with the outer surface of the upper housing, thus forming a continuous outer ribbed surface between the upper valve half and upper housing. The lid component similarly attaches to the opposite side of the upper housing. A continuous outer surface is thus formed when the three segments of the upper housing assembly are attached as shown in FIGS. 1A-2B.

Figure 4:
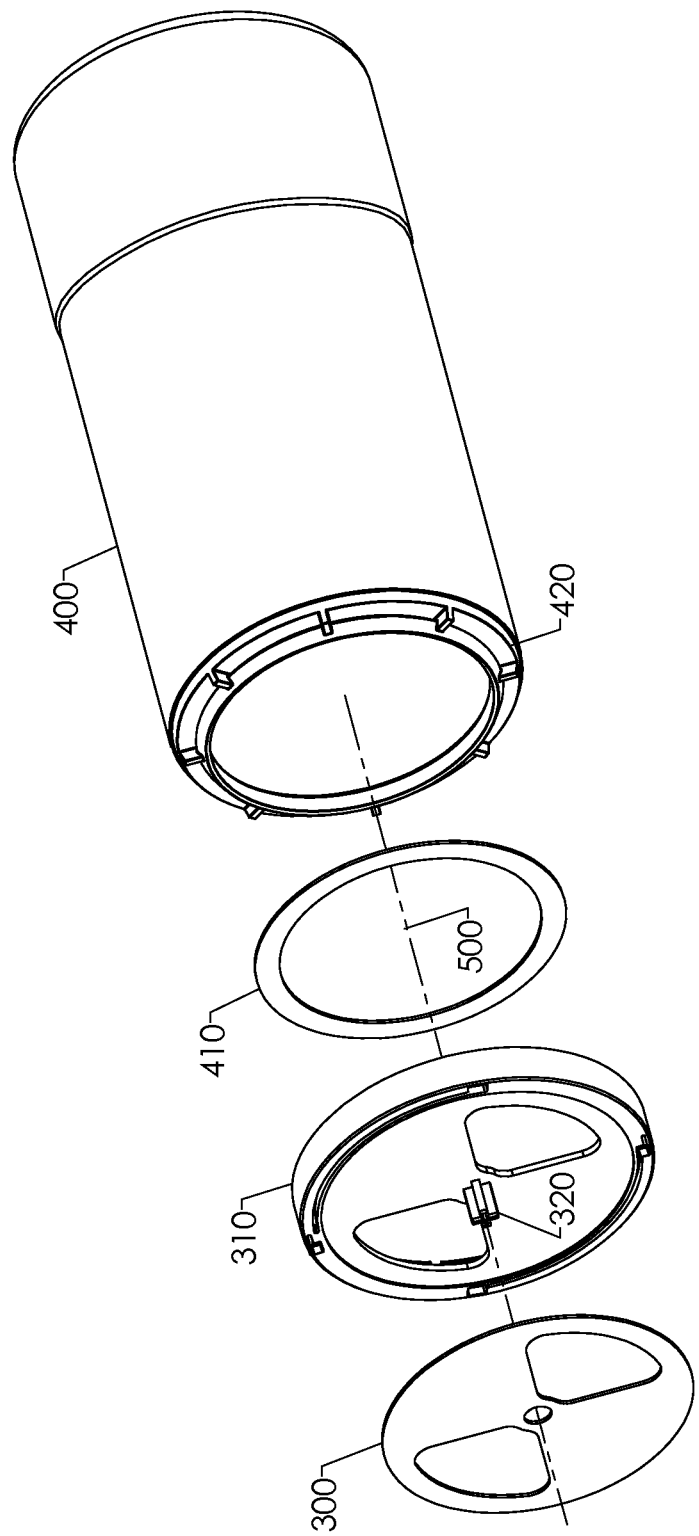
FIG. 4 is an exploded view of the lower housing assembly an exemplary embodiment of the twist-action mixing container.

FIG. 4 shows the lower housing assembly including the lower housing 400, a ring gasket 410, the lower valve half 310, and a main valve gasket 300. The ring gasket 410 is disposed between the lower housing 400 and the lower valve half 310. The ring gasket may be conformed to fit over the peripheral ridge of the lower housing rim or a retaining frame on the underside of the lower valve half. The gaskets described herein help to provide a hermetic seal around the upper and lower chambers when the mixing container is in a closed position.

As previously discussed, the lower valve half 410 is attached to the top of the lower housing by clipping the ring of retaining flange members 450 onto retaining clips 420 disposed round the peripheral ridge of the lower housing rim. When the lower valve half 310 is clipped onto the lower housing 400, it fits snugly over the lower housing rim so that the outer surface of the lower valve half is flush with the outer surface of the lower housing, thus forming a continuous outer surface between the lower housing and the lower valve half as shown in FIGS. 1A-2B.

FIG. 5A shows the split valve assembly 200 of the present invention with the lower valve half 310 connected to the upper valve half 210. The upper and lower valve halves are connected when the guide members of the respective valve halves are inserted into their corresponding tracks via the aforementioned loading ports. This means of connection allows the upper and lower valve halves to rotate with respect to one another, as well as any structure attached to the upper and lower valve halves.

FIG. 5B shows an exploded view of the split valve assembly 200 with gaskets on both side of the respective valve halves. More specifically, a main valve gasket 300 is interposed between the upper and lower valve halves. According to one embodiment, the main valve gasket is seated in a retaining frame on the upper side of the lower valve half 310. Alternatively, the main valve gasket may be seated in a retaining frame on the lower side of the upper valve half 210. In addition, the main valve gasket may be permanently affixed to the surface of said upper or lower valve half. The lower housing gasket 410 may be seated in a retaining frame on the lower side of the lower valve half and may be permanently affixed thereto. Similarly, the upper housing gasket 190 may be seated in a retaining frame on the upper side of the upper valve half and may be permanently affixed thereto. The component parts of the split valve assembly shown in FIG. 6B are able to rotate along axis of rotation 500.

FIG. 5C is a close-up view of a lower valve guide member 350. In a preferred embodiment, the lower valve half guide members include male ratcheting teeth 370 that engage with female ratcheting teeth 220 disposed along an inner wall of the upper valve tracks 240 shown in FIG. 6. The ratcheting teeth prevent the guide members 350 from moving backward along the track, i.e. they can only move in a forward direction toward the end of the track. Thus, the valve halves and connected housings can only be rotated in one direction relative to each other. However, one of ordinary skill in the art will recognize that the guide members and corresponding tracks may be configured to allow two-way travel of the guide members, thereby allowing forward and backward rotation of the valve halves and connected housings.

FIG. 5D is a close-up view of the ribbed outer surface 280 of the upper valve half 210, along with a guide member 250 and retaining flange members 440. The ribbed outer surface 280 provides an effective gripping surface to facilitate manual twisting of the upper valve half with respect to the lower valve half. As previously discussed, each guide member 250 is configured to enter a corresponding track in the lower valve half through a loading port.

Figure 6:
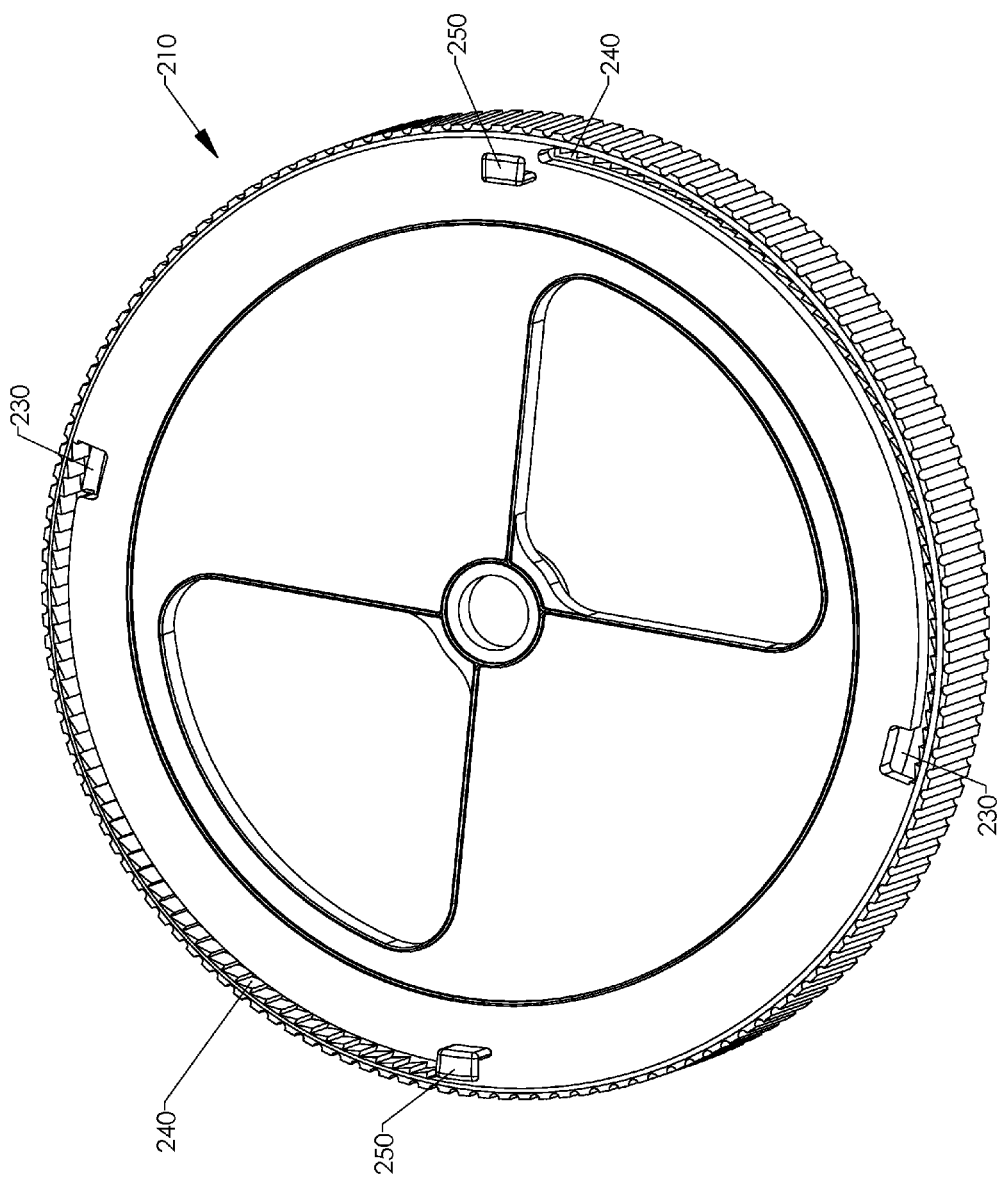
FIG. 6 is a perspective view of the upper valve half of the split valve assembly of FIG. 5A.

FIG. 6 shows an upper valve half of the present invention with two opposing recessed tracks 240 arcing along its periphery and two opposing guide members 250. Each track includes female ratcheting teeth along an inner wall for engaging with male ratcheting teeth on a corresponding guide member 350. In addition, loading port 230 is shown, in which a guide member may be inserted and retained in order to enter the track. Gasket interface ribs 260 define a retaining frame for a gasket, such as main valve gasket 300. One of ordinary skill will appreciate that any number of tracks may be disposed along the upper or lower valve halves, including one continuous track along the perimeter of the valve half, or multiple arc shaped tracks as shown in FIGS. 6 and 7. Similarly, one or more corresponding guide members may be disposed on the valve halves for insertion into the tracks.

FIG. 7 shows the lower valve half with two opposed recessed tracks 340 along its periphery and two opposing guide members 350. In addition, loading ports 330 are shown for receiving guide members. Interlock member 320 extends from the center of the lower valve half for operably coupling with preventer 150. More specifically, the interlock member 320 passes through the center opening in the upper valve half and is inserted into preventer shaft 160, which is configured to receive the interlock member. The interlock member of FIG. 7 is cruciform shaped, but one of ordinary skill will appreciate that the interlock member may assume other shapes, such as a star or polygon, in which case the preventer shaft will be configured to receive that other shape.

Figure 8:
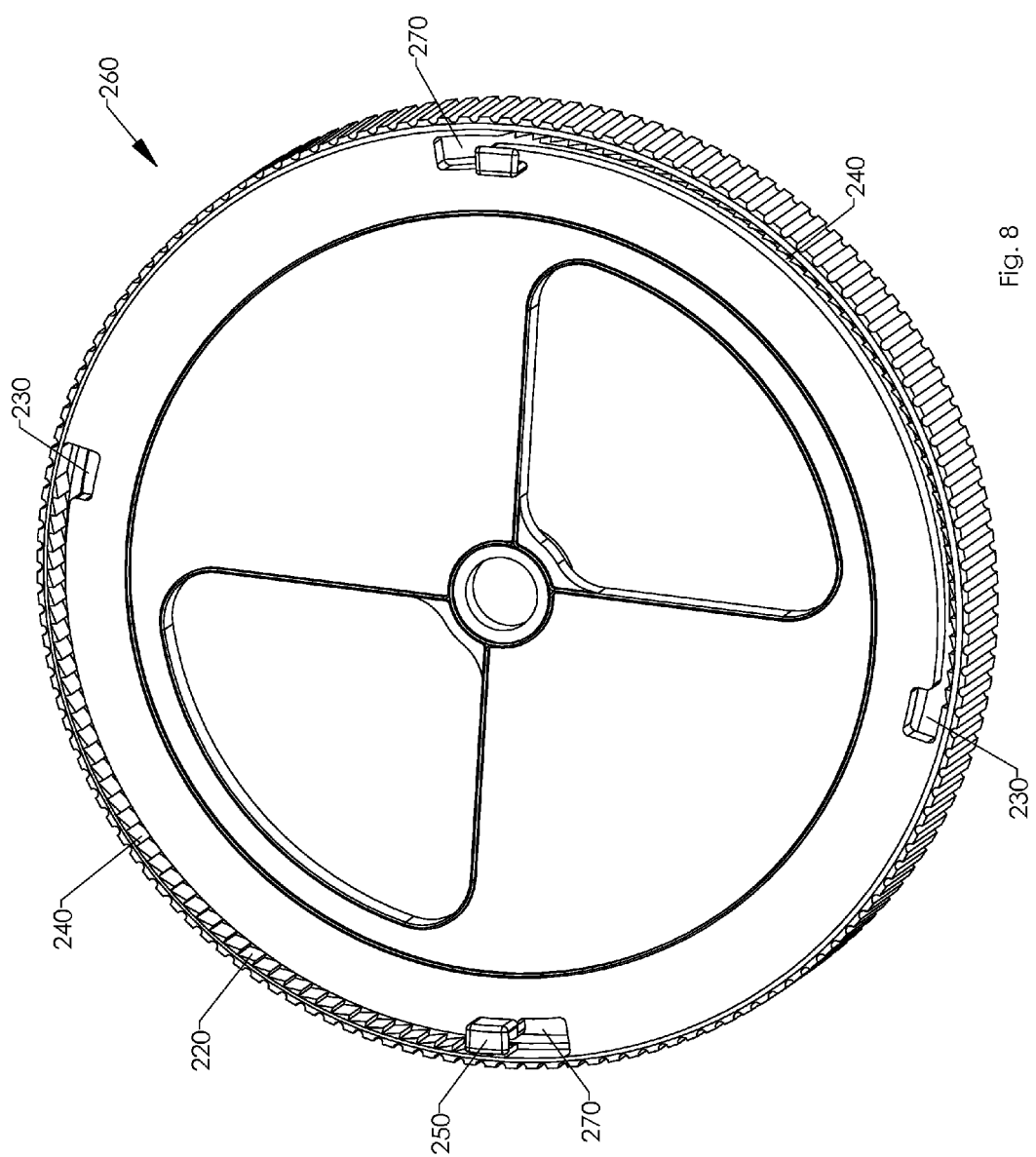
FIG. 8 is a perspective view of a releasable upper valve half of the split valve assembly according to an alternate embodiment of the present invention.
Figure 9:
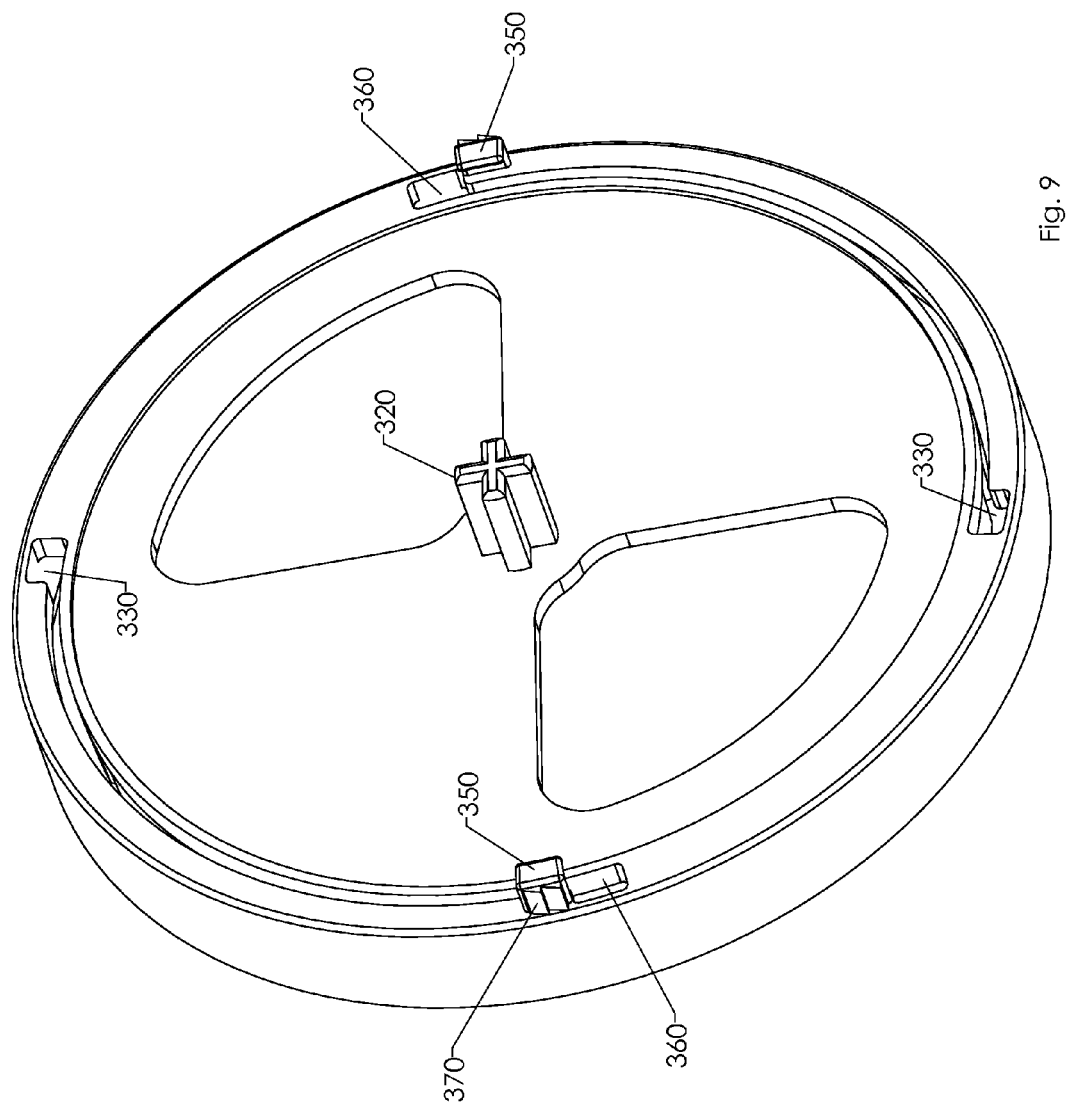
FIG. 9 is a perspective view of a releasable lower valve half of the split valve assembly according to an alternate embodiment of the present invention.

FIG. 8-9 shows an alternate embodiment of the upper and lower valve halves. In this embodiment, the upper and lower valves feature release ports 270 and 360 respectively. The release ports are disposed at the ends of each track and allow the guide members to be released from their corresponding tracks. According to this embodiment, the guide members are simultaneously released when they reach the ends of their respective tracks since the tracks are of equal lengths. Once the guide members are released, the upper and lower valve halves can separate.

Figure 10:
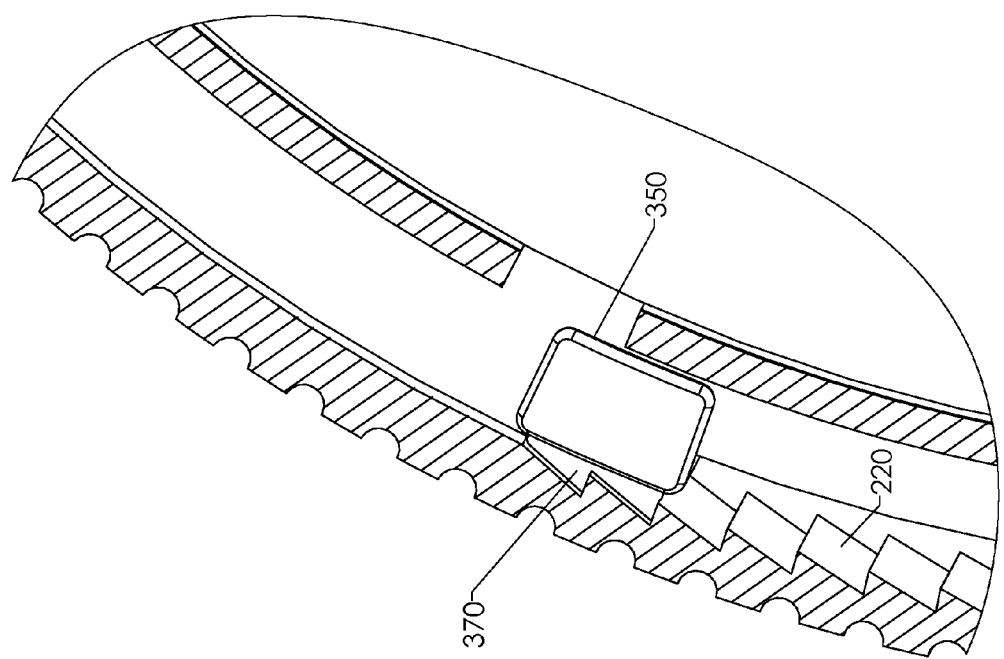
FIG. 10 is a partial sectional close-up view of the split valve assembly of FIG. 5A showing a lower valve guide member inside an upper valve track.

FIG. 10 shows a close-up view of a lower valve guide member 350 inside an upper valve track 240. Furthermore, the male ratcheting teeth of the guide member are shown engaged with the female ratcheting teeth disposed along the inner wall of the track. The guide member of FIG. 10 can only move forward toward the end of the track since the ratcheting teeth prevent it from moving backward.

FIGS. 11A-11B show a partial sectional view and close-up view of the interlock member 320 coupled to the preventer 150. This coupling is accomplished by inserting the interlock member 320 into preventer shaft 160, which is configured to receive the interlock member. Once the interlock member 320 is operably coupled to the preventer 150, the lower valve half 310 and preventer 150 are able to rotate in concert.

FIG. 12 shows a top view of the twist-action mixing container 100 and FIG. 13 is a partial sectional view of the mixing container along line AA. According to the embodiment shown in FIG. 14, the lid component 110 is attached to the upper housing 180 by way of retaining flange members 430 hooked onto retaining clip members 420. Furthermore, the preventer 150 is seated at the top of upper housing 180 and is operably coupled to the lower valve half 310. The cap gasket 140 is interposed between the preventer and the lid component. The upper and lower valves are connected by way of the guide members inserted into corresponding tracks and the lower valve half is attached to the lower housing by way of retaining flange members 450 hooked onto retaining clips 460.

According to an embodiment of the present invention, a Cap gasket 140 is interposed between lid component 110 and the upper housing 180 and preventer 150; upper housing gasket 190 is interposed between the upper valve half 210 and upper housing 180; main valve gasket 300 is interposed between the upper and lower valve halves; and lower housing gasket 410 is interposed between lower valve half 310 and lower housing 400.

FIG. 14 is a close-up partial sectional view of the top portion of the mixing container. In this view the flip-top cap 130 is shown in a closed position covering an opening in lid component 110. Lid component flange members 430 are shown hooked onto upper housing retaining clips 420. In addition, the cap gasket 140 is shown interposed between lid component 110, upper housing 180 and preventer 150. More specifically, the cap gasket sits on top of the preventer 150 and is partially compressed by the retaining clips 420 as shown in FIG. 14. The cap gasket is thus held stationary against the lid by the upper housing retaining clips 420 while the preventer is able to rotate underneath. As discussed above, the preventer rotates when the lower housing is rotated relative to the upper housing. When the limit of rotation is reached, as dictated by the guide members reaching the ends of their respective tracks, the preventer opening(s) is aligned with the openings of the split valve assembly, the cap gasket, and the lid opening.

FIG. 15 is a close-up partial sectional view of the split valve assembly, upper housing, and lower housing. The upper housing 180 is shown attached to the upper valve half 210 by way of retaining flange members 440 of the upper valve half hooked onto retaining clip members 420 of the upper housing. Similarly, the lower valve half 310 is attached to the lower housing 400 by way of retaining flange members 450 hooked onto retaining clips 460 of the lower housing. The upper and lower valve halves are connected to each other via guide members inserted into their respective tracks and a main valve gasket 300 is interposed between the upper and lower valve halves. As can be seen in FIG. 15, the main valve gasket is partially compressed between the upper and lower valve halves.

FIG. 16A shows a bottom view of the split valve assembly 200 according to an embodiment of the present invention, while FIG. 16B shows a top view of the split valve assembly. As can be seen in the figures, retaining flange members are situated on both sides of the split valve assembly; one set of flange members 450 being disposed on the bottom side of the lower valve half; and the other set of flange members being disposed on the top side of the upper valve half. FIG. 16C shows a close-up partial sectional view of a lower valve guide member 350 in a corresponding upper valve track 240. As can be seen, the guide member's male ratcheting teeth are engaged with the female ratcheting teeth along an inner wall of the track. According to this figure, the guide member has reached the end of the track and is unable to move backward because the engaged ratcheting teeth prevent backward movement.

Figure 17B:
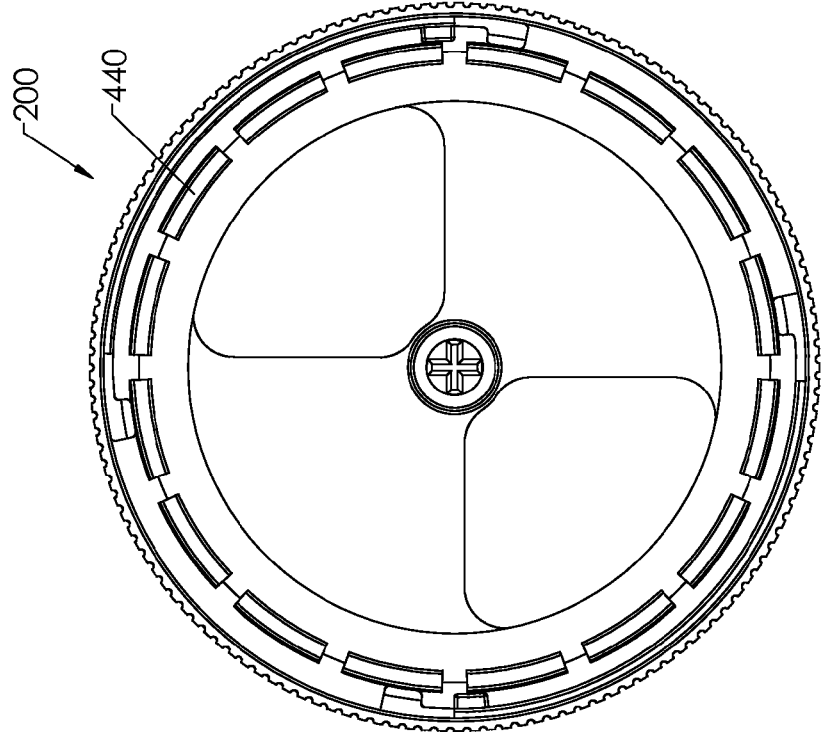
FIG. 17B is a top plan view of a releasable split valve assembly according to an alternate embodiment of the present invention.
Figure 17A:
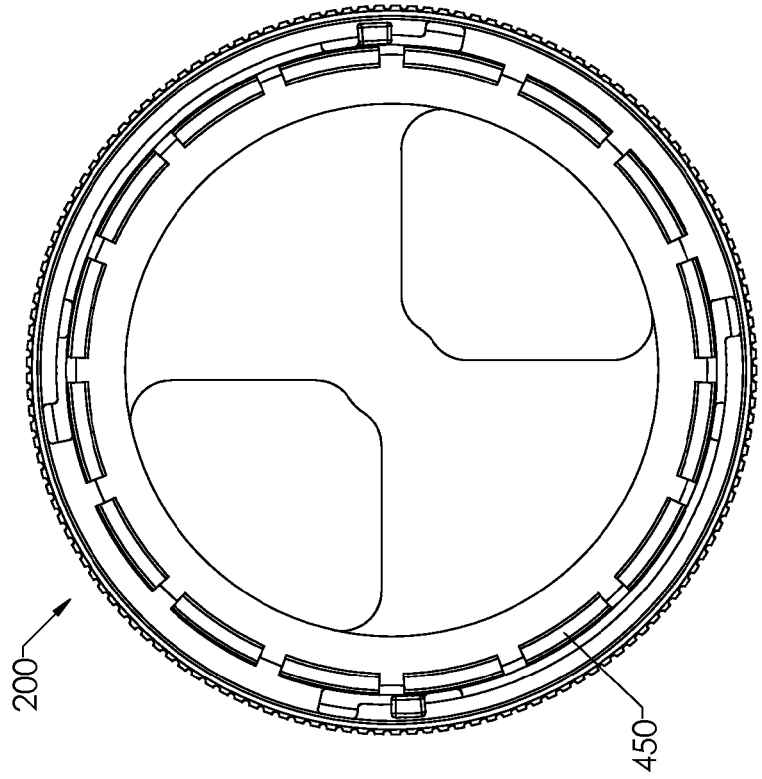
FIG. 17A is a bottom plan view of a releasable split valve assembly according to an alternate embodiment of the present invention.

FIGS. 17A-17B show top and bottom views respectively of an alternative embodiment of the split valve assembly that includes release ports on the upper and lower valve halves, as previously described and shown in FIGS. 8 and 9.

Although the embodiments shown and described herein disclose a two chambered mixing container, an alternate embodiment may include a plurality of compartments. Each of the compartments defines a chamber therein and may be separated by a split valve assembly as previously described. In embodiments where more than two chambers are utilized, multiple split valve assemblies may be utilized in order to allow for mixing of multiple chambers in a single chamber. Alternative split valve assemblies may be utilized in these embodiments, where only one of the split valve assemblies has an opening that allows the mixed contents to be poured out.

Furthermore, the twist action mixing container may include pressurized chambers depending on the type of contents being stored therein. The mixing container is especially useful in storing and mixing alcoholic and nonalcoholic drinks, however there are many other useful applications one can envision for this invention including the storage of various chemicals that may advantageously be combined when desired. Other embodiments could be utilized in the mixing of two or more components for other purposes as well. For instance, embodiments of the present invention could be used for the mixing of cooking ingredients (ie, eggs and flour), medicine (ie, antibiotics and saline solutions), or automotive maintenance fluids (ie, apoxis or paint with thinner for touch ups).

Additionally, while embodiments of the present invention as described herein have focused on a twist action to move the components of the invention into alignment, allowing for the contents of the chambers to mix, other action elements could be utilized to cause the alignment to occur. For instance, instead of a twist action, an embodiment of the present invention could include a ripcord with one end extending through a side wall of the valve assembly or other component, whereby pulling of the ripcord would cause the components of the invention to move into alignment, allowing the contents to mix. Other action elements include, but are not limited to, buttons, push dials, turn dials, pneumatic means, hand cranks or any combination thereof. One of ordinary skill in the art would appreciate that there are numerous types of action elements that could be utilized with embodiments of the present invention, and embodiments of the present invention are contemplated for use with any type of action elements.

In embodiments where an action element may be engaged by a remote system, such as a pneumatic action element or other automatic action element, the apparatus may be further comprised of one or more of a printed circuit board (PCB), control logic element, computing element, processor, communications means, or any combination thereof. These elements may be configured to work in conjunction and allow for receipt of communications from a remote device for the purpose of causing the action element to engage. Remote devices capable of providing communications to the elements include, but are not limited to, remote controls, Infrared (IR) devices, Bluetooth devices, smartphones, tablet PCs, radio frequency (RF) communication devices, or any combination thereof. For instance, an application on a smartphone may be configured to identify the elements and transmit a signal to the elements, causing the action element to engage. Communications may be via one or more signal types, such as Bluetooth, Bluetooth Low-Energy, Wifi, cellular (e.g., CDMA, GSM), near field communication (NFC), RF, IR or any combination thereof. One of ordinary skill in the art would appreciate that there are numerous types of communications signals that could be used with embodiments of the present invention and embodiments of the present invention are contemplated for use with any type of communication signal.

One of ordinary skill in the art would appreciate that there are numerous applications for embodiments of the present invention, and embodiments of the present invention are contemplated for use with any appropriate application.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A twist-action mixing container comprising:
an upper housing, said upper housing defining an upper chamber;
a lower housing, said lower housing defining a lower chamber;
a valve assembly interposed between said upper housing and lower housing;
a rotatable preventer seated at the top of said upper housing; and
a lid component with an opening, said lid component being secured to the top of said upper housing,
wherein said valve assembly forms a seal between said upper and lower chambers and comprises an upper valve half and a lower valve half,
wherein said upper valve half is secured to the bottom of said upper housing and said lower valve half is secured to the top of said lower housing,
wherein said lower valve half comprises an interlock member,
wherein said upper and lower valve halves each comprise at least one track and corresponding guide member,
wherein said upper valve track is configured to securely receive said lower valve guide member and said lower valve track is configured to securely receive said upper valve guide member thereby joining the upper and lower valve halves together to form said valve assembly, and wherein said guide members in said valve assembly travel along their corresponding tracks when at least one of said housings is rotated relative to the other,
wherein said rotatable preventer comprises an opening and a shaft configured to receive said interlock member so as to operably couple said preventer to said lower valve half, such that said preventer and said lower valve half are able to rotate in concert,
wherein said preventer is configured to prevent the contents of said container from passing through said lid opening until said preventer opening is aligned with the openings of said upper and lower valve halves and said lid opening is uncovered;
whereby said housings may be rotated in opposite directions, thereby causing said guide members to travel along their corresponding tracks until the openings of the lower valve half, upper valve half, preventer, and lid component are aligned, allowing the contents of either chamber to flow into the other chamber where they can mix and be poured out of the container.

2. The twist-action mixing container of claim 1, wherein said lid component is secured to said upper housing with one or more retaining members along its inner periphery that mate with one or more hook members along the top outer rim of said upper housing.

3. The twist-action mixing container of claim 1, wherein said upper valve half is secured to said upper housing with one or more retaining members along its top periphery that mate with one or more hook members along the bottom outer rim of said upper housing.

4. The twist-action mixing container of claim 1, wherein said lower valve half is secured to said lower housing with one or more retaining members along its bottom periphery that mate with one or more hook members along the top outer rim of said lower housing.

5. The twist-action mixing container of claim 1, wherein a gasket is interposed between said preventer and said lid component.

6. The twist-action mixing container of claim 5, wherein a gasket is interposed between said upper housing and said upper valve half.

7. The twist-action mixing container of claim 6, wherein said upper valve half comprises one or more gasket interface ribs configured to receive said gasket.

8. The twist-action mixing container of claim 7, wherein a gasket is interposed between said lower valve half and said lower housing.

9. The twist-action mixing container of claim 8, wherein said lower valve half comprises one or more gasket interface ribs configured to receive said gasket.

10. The twist-action mixing container of claim 9, wherein said gaskets form hermetic seals around said chambers.

11. The twist-action mixing container of claim 1, wherein said interlock member extends from the center, top side of said lower valve half.

12. The twist-action mixing container of claim 1, wherein said upper valve track comprises ratcheting teeth that engage with a corresponding lower valve guide member, so as to allow one-way travel of said guide member along said track.

13. The twist-action mixing container of claim 1, wherein said lower valve guide member comprises ratcheting teeth that cooperate with said corresponding upper valve track ratcheting teeth to allow one-way travel of said guide member along said track.

14. The twist-action mixing container of claim 1 wherein at least one of said tracks comprise:
- a loading port at the beginning of said track for initially receiving and anchoring a corresponding guide member; and
- a release port at the end of said track for optionally releasing said guide member after it has traveled the length of said track;
- whereby release of said guide members allows the upper and lower valve halves and upper and lower housings to separate.

15. The twist-action mixing container of claim 1 wherein said lid component comprises a removable cap.

16. The twist-action mixing container of claim 1 wherein said lid component comprises a flip top cap.

17. The twist-action mixing container of claim 1 wherein said interlock member is a cruciform.

18. A twist-action mixing container comprising:
- two or more vertically stacked compartments, each compartment defining a chamber;
- a valve assembly interposed between each of said compartments;
- a rotatable preventer seated at the top of the uppermost compartment; and
- a lid component with an opening, said lid component being secured to the top of said uppermost compartment;
- wherein said valve assembly forms a seal between each of said chambers and comprises an upper valve half and a lower valve half,
- wherein said upper valve half is secured to the bottom of every compartment except the lowest compartment and said lower valve half is secured to the top of every compartment except the top compartment,
- wherein each of said lower valve halves comprises an interlock member operably coupled to the lower valve half of the split valve assembly directly above it,
- wherein said upper and lower valve halves each comprise at least one track and corresponding guide member,
- wherein said upper valve track is configured to securely receive said lower valve guide member and said lower valve track is configured to securely receive said upper valve guide member thereby joining the upper and lower valve halves together to form said valve assembly, and wherein said guide members of said valve assembly travel along their corresponding tracks when at least one compartment attached to said valve assembly is rotated,
- wherein said rotatable preventer comprises an opening and a shaft configured to receive the interlock member of the lower valve half in the valve assembly directly below it, so as to operably couple said preventer to all of said lower valve halves, such that said preventer and said lower valve halves are able to rotate in concert,
- wherein said preventer is configured to prevent the contents of said container from passing through said lid opening until said preventer opening is aligned with the openings of said upper and lower valve halves and said lid opening is uncovered;
- whereby said at least one compartment may be rotated relative to the others, thereby causing said guide members in the valve assembly attached to said compartment to travel along their corresponding tracks until the openings of the valve assemblies, preventer, and lid are aligned, allowing the contents of the compartments to flow between the chambers, mix and be poured out of the container.

* * * * *